(12) United States Patent

Hirayama et al.

(10) Patent No.: US 9,599,000 B2
(45) Date of Patent: Mar. 21, 2017

(54) REDUCTANT CONTAINER

(71) Applicant: KOBELCO CONSTRUCTION MACHINERY CO., LTD., Hiroshima-shi (JP)

(72) Inventors: Michio Hirayama, Hiroshima (JP); Yu Yoshida, Hiroshima (JP); Atsushi Omori, Hiroshima (JP); Hiroaki Sunada, Hiroshima (JP); Shinji Kiyomihara, Hiroshima (JP); Shinkichi Ninomiya, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 86 days.

(21) Appl. No.: 14/627,631

(22) Filed: Feb. 20, 2015

(65) Prior Publication Data

US 2015/0247439 A1 Sep. 3, 2015

(30) Foreign Application Priority Data

Feb. 28, 2014 (JP) ................................ 2014-038064

(51) Int. Cl.
*A47J 27/00* (2006.01)
*F24H 1/20* (2006.01)
(Continued)

(52) U.S. Cl.
CPC ......... *F01N 3/2896* (2013.01); *F01N 3/2066* (2013.01); *F01N 2560/06* (2013.01);
(Continued)

(58) Field of Classification Search
None
See application file for complete search history.

(56) References Cited

U.S. PATENT DOCUMENTS 1,857,510 A * 5/1932 Hyde ..................... F24H 1/18
219/520
1,983,043 A * 12/1934 Martin ..................... F23K 5/20
392/451
(Continued)

FOREIGN PATENT DOCUMENTS

DE   10 2010 024 022 A1   12/2011
EP      2 574 749 A1       4/2013
(Continued)

OTHER PUBLICATIONS

Extended European Search Report issued Jul. 27, 2015 in Patent Application No. 15155909.3.

*Primary Examiner* — Thor Campbell
(74) *Attorney, Agent, or Firm* — Oblon, McClelland, Maier & Neustadt, L.L.P.

(57) ABSTRACT

A reductant container having: a tank main body that accommodates a reductant; a heating member disposed in the tank main body and configured to generate heat so as to increase a temperature of the reductant; a covering member covering the heating member and having an inflow portion, the inflow portion allowing some of the reductant to flow into the covering member; a reductant supply pipe through which the reductant in the covering member is supplied to the outside of the tank main body; and a temperature measuring unit having a temperature sensor disposed in the covering member to sense a temperature of the reductant, the temperature measuring unit determining the temperature sensed by the temperature sensor, wherein the covering member has an upper wall covering the heating member from above, the upper wall having a lower surface that is inclined so as to be raised toward the temperature sensor.

5 Claims, 6 Drawing Sheets

(51) Int. Cl.
  *H05B 3/78* (2006.01)
  *F01N 3/28* (2006.01)
  *F01N 3/20* (2006.01)

(52) U.S. Cl.
  CPC ...... *F01N 2610/02* (2013.01); *F01N 2610/10* (2013.01); *F01N 2610/1406* (2013.01); *F01N 2610/148* (2013.01); *Y02T 10/24* (2013.01)

(56) References Cited

U.S. PATENT DOCUMENTS

| | | | | |
|---|---|---|---|---|
| 2,742,560 | A * | 4/1956 | Liebhafsky | F24H 1/202 219/513 |
| 2,784,291 | A * | 3/1957 | Harney | F24H 1/202 392/452 |
| 3,597,588 | A * | 8/1971 | Kirschner | F24H 9/0021 122/32 |
| 5,386,100 | A * | 1/1995 | McNair | H05B 3/82 219/437 |
| 5,457,767 | A * | 10/1995 | Frank | A47J 31/54 392/449 |
| 7,313,322 | B2 * | 12/2007 | Starck | B60S 1/488 392/441 |
| 7,943,101 | B2 * | 5/2011 | Osaku | B01D 53/9431 422/105 |
| 8,459,013 | B2 * | 6/2013 | Hosaka | F01N 3/2066 220/562 |
| 2003/0094458 | A1 * | 5/2003 | Beyer | B60K 15/03519 220/562 |
| 2007/0059222 | A1 * | 3/2007 | Satou | F01N 3/2066 422/177 |
| 2007/0202019 | A1 | 8/2007 | Nishina et al. | |
| 2008/0247912 | A1 * | 10/2008 | Izutani | F01N 11/00 422/82.12 |
| 2009/0127265 | A1 * | 5/2009 | Magnusson | F01N 3/2066 220/564 |
| 2010/0313631 | A1 * | 12/2010 | Yanagi | G01N 9/36 73/25.01 |
| 2011/0011178 | A1 * | 1/2011 | Ulrich | G01F 23/242 73/292 |
| 2011/0138790 | A1 * | 6/2011 | Radillo | F01N 3/206 60/303 |
| 2011/0138791 | A1 * | 6/2011 | Li | F01N 3/206 60/303 |
| 2012/0301123 | A1 * | 11/2012 | Haeberer | F01N 3/2066 392/441 |
| 2013/0000743 | A1 | 1/2013 | Crary | |
| 2013/0167622 | A1 * | 7/2013 | Frivik | F01N 3/208 73/61.46 |
| 2013/0219869 | A1 | 8/2013 | Brueck et al. | |
| 2014/0334983 | A1 * | 11/2014 | Yang | F01N 11/00 422/119 |

FOREIGN PATENT DOCUMENTS

| | | |
|---|---|---|
| JP | 3686668 | 8/2005 |
| WO | WO 2011/068203 A1 | 6/2011 |
| WO | WO 2012/095260 A1 | 7/2012 |

* cited by examiner

REDUCTANT CONTAINER

TECHNICAL FIELD

The present invention relates to a reductant container for supplying a reductant to a predetermined section in accordance with the temperature of the reductant measured by a temperature measuring unit.

BACKGROUND ART

For the purpose of eliminating nitrogen oxide of an exhaust gas in the engine of a construction machine or the like, the construction machine is provided with a reductant container for supplying a reductant into an exhaust pipe through which the exhaust gas passes. If the reductant container is used in a cold region, there is a possibility that the reductant in the reductant container freezes. In order to cope this situation, the reductant container is equipped with a heating member for unfreezing the frozen reductant by means of heat exchange. This type of reductant container has a container main body for containing the reductant, a heat exchanger for unfreezing the reductant by exchanging heat with the reductant contained in the container main body, a protector disposed to surround the heat exchanger to rapidly unfreeze the reductant around the heat exchanger, and a suction pipe with an inlet port that is located inside the protector and suctions the reductant unfrozen by the heat exchanger (see Japanese Patent No. 3686668, for example). This reductant container has the protector surrounding the heat exchanger so that the reductant around the heat exchanger can be unfrozen rapidly. The reductant unfrozen by the heat exchanger is supplied to the inside of the exhaust pipe through the suction pipe.

The reductant to be supplied to the inside of the exhaust pipe is required to satisfy a predetermined concentration condition. This reductant container has a concentration meter provided inside the protector. When the concentration of the reductant specified by this concentration meter reaches a predetermined value, the reductant is supplied to the inside of the exhaust pipe through the suction pipe. Specifically, in this reductant container, the concentration meter senses the temperature of the reductant in the product and specifies a concentration of the reductant based on the sensed temperature. Then, when the concentration of the reductant specified by the concentration meter satisfies a predetermined concentration condition, a feed device such as a pump supplies the reductant to the inside of the exhaust pipe through the suction pipe. In this reductant container, the reductant in the protector is unfrozen by the heat exchanger, and the temperature of the unfrozen reductant is sensed by the concentration meter, as described above. Consequently, the reductant satisfying the predetermined concentration condition is supplied to the inside of the exhaust pipe.

Incidentally, in the reductant container, even when the temperature of the reductant unfrozen reaches a predetermined temperature around the suction port, the reductant is not supplied to the inside of the exhaust pipe if the temperature of the reductant sensed by the temperature measuring unit is below a predetermined temperature. In other words, in this reductant container, in a case where the temperature of the reductant sensed by the temperature measuring unit is below the predetermined temperature, the temperature of the reductant in the protector is determined as not satisfying the predetermined concentration condition and therefore is not supplied to the inside of the exhaust pipe. However, of the reductant in the protector that is unfrozen by the heat exchanger, when the temperature of the reductant around the temperature measuring unit increases slowly, it takes a certain amount of time for the temperature sensed by the temperature measuring unit to reach the predetermined temperature. Even when the reductant in the protector is unfrozen rapidly by the heat exchanger surrounded by the protector, it takes a certain amount of time from unfreezing the reductant to supplying the resultant reductant so long as the temperature of the reductant around the temperature measuring unit increases slowly.

SUMMARY OF INVENTION

The present invention was contrived in view of such circumstances, and an object thereof is to provide a reductant container capable of unfreezing a reductant and reducing the time taken from unfreezing the reductant to supplying the resultant reductant.

The present invention is a reductant container having the following configurations: a tank main body that accommodates a reductant; a heating member disposed in the tank main body and configured to generate heat so as to increase a temperature of the reductant; a covering member covering the heating member and having an inflow portion, the inflow portion allowing some of the reductant accommodated in the tank main body to flow into the covering member; a reductant supply pipe through which the reductant in the covering member is supplied to the outside of the tank main body; and a temperature measuring unit having a temperature sensor disposed in the covering member to sense a temperature of the reductant in the covering member, the temperature measuring unit determining the temperature sensed by the temperature sensor, wherein the covering member has an upper wall covering the heating member from above, the upper wall having a lower surface that is inclined so as to be raised toward the temperature sensor.

DESCRIPTION OF EMBODIMENTS

An embodiment of the present invention is described hereinafter with reference to the drawings. The following embodiment is merely a concrete example of the present invention and is not intended to limit the technical scope of the present invention.

Moreover, each of the diagrams to be referred to in the following description schematically illustrates the primary members required to describe the present invention, among the constituents of the present embodiment. Therefore, a reductant container according to the present invention can have any constituents which are not shown in the diagrams to be referred to in the present specification.

First of all, a construction machine with a reductant container X1 according to the present embodiment is described with reference to FIG. 1. The construction machine shown in FIG. 1 has an engine E1, an exhaust pipe D1, the reductant container X1, and an engine cooling tank C1.

The engine E1 activates the construction machine. The exhaust pipe D1 discharges the exhaust gas, emitted from the engine E1, to the outside of the of the construction machine. The reductant container X1 contains urea water U1 to be supplied to the exhaust pipe D1. Ammonia, produced from the urea water U1 supplied to the exhaust pipe D1, purifies the exhaust gas by a reduction reaction with nitrogen oxide contained in the exhaust gas.

The engine cooling tank C1 is connected to a water jacket WJ of the engine E1. The water jacket WJ allows water retained in the engine cooling tank C1 to flow into the water jacket WJ. The water jacket WJ then causes heat exchange between the water flowing into the water jacket WJ and the engine E1, to cool the engine E1.

Figure 1:
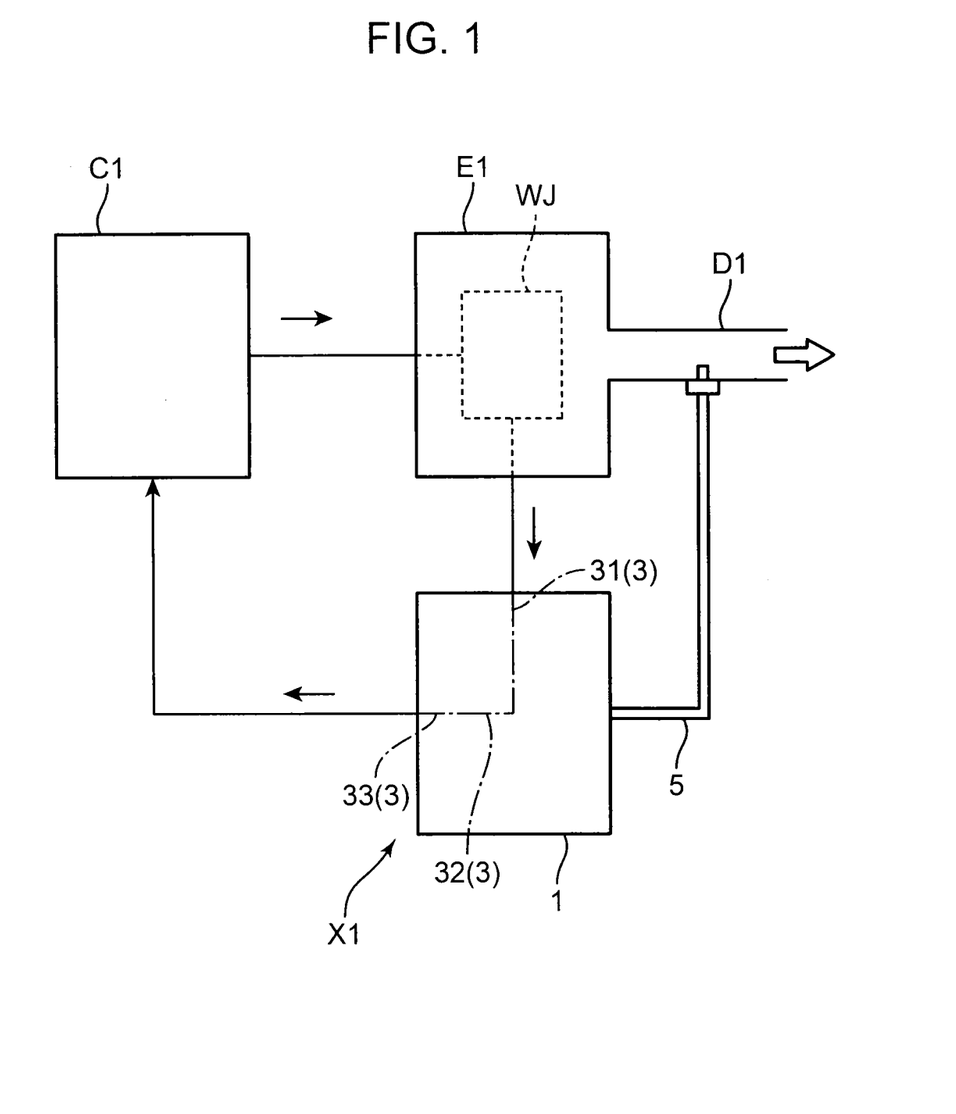
FIG. 1 is a schematic diagram showing the substantial portions of a construction machine equipped with a reductant container according to an embodiment.

In a case where the construction machine shown in FIG. 1 is used in a cold region and thereby the urea water U1 contained in a tank main body 1 of the reductant container X1 freezes, the frozen urea water U1 needs to be unfrozen in order to be supplied to the exhaust pipe D1. The construction machine shown in FIG. 1, therefore, causes engine cooling water, which becomes warm water by passing through the water jacket WJ, to flow into a heat exchange pipe 3 of the reductant container X1, and causes the warm water passing through the heat exchange pipe 3 to flow out to the engine cooling tank C1. Then, the heat exchange pipe 3 causes heat exchange between the warm water flowing into the heat exchange pipe 3 and the frozen urea water U1, thereby unfreezing the frozen urea water U1. In the present embodiment, the engine cooling water that becomes warm water by passing through the water jacket WJ is supplied to the heat exchange pipe 3 of the reductant container X1, whereby the frozen urea water U1 becomes unfrozen in the reductant container X1.

Next, the reductant container X1 according to the present embodiment is described in detail with reference to FIGS. 2 to 6. As shown in FIGS. 2 to 6, the reductant container X1 has the tank main body 1, a support member 2, the heat exchange pipe 3, a covering member 4, a reductant suction pipe 5, and a temperature measuring unit 6.

Figure 2:
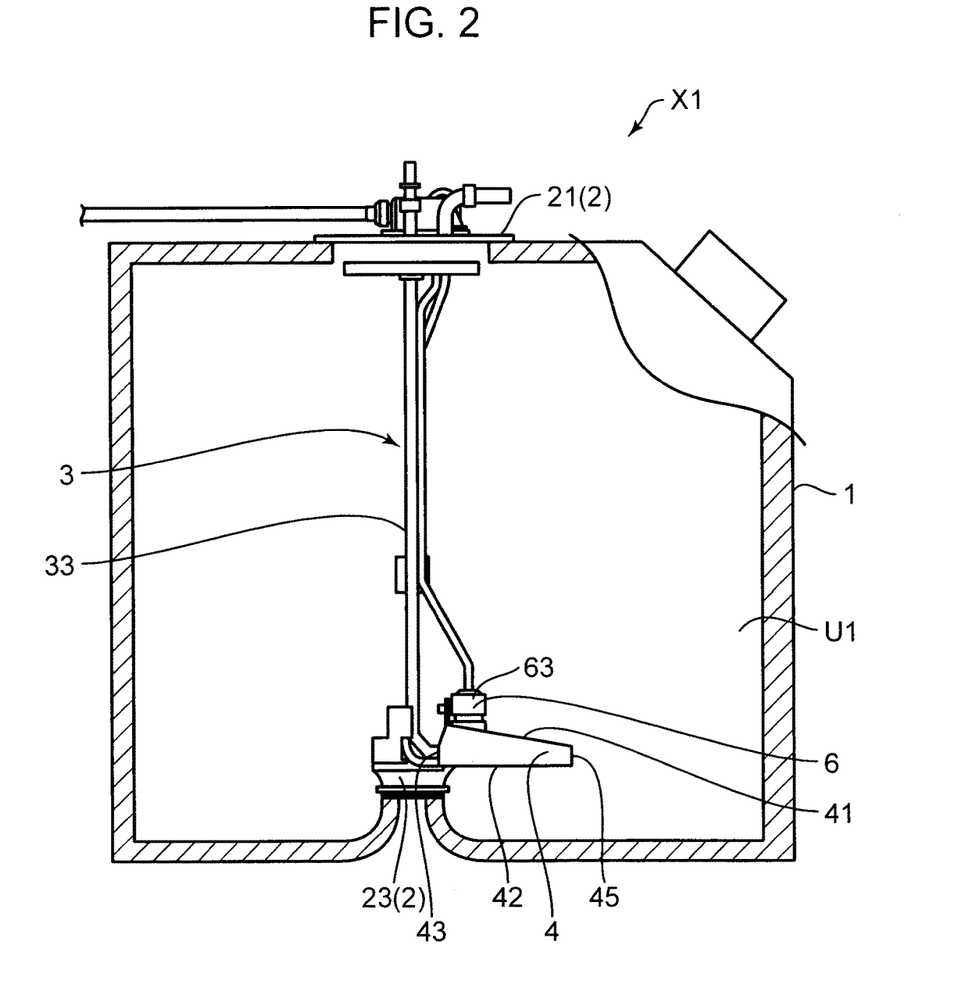
FIG. 2 is a partial cross-sectional diagram showing the reductant container according to the embodiment.
Figure 3:
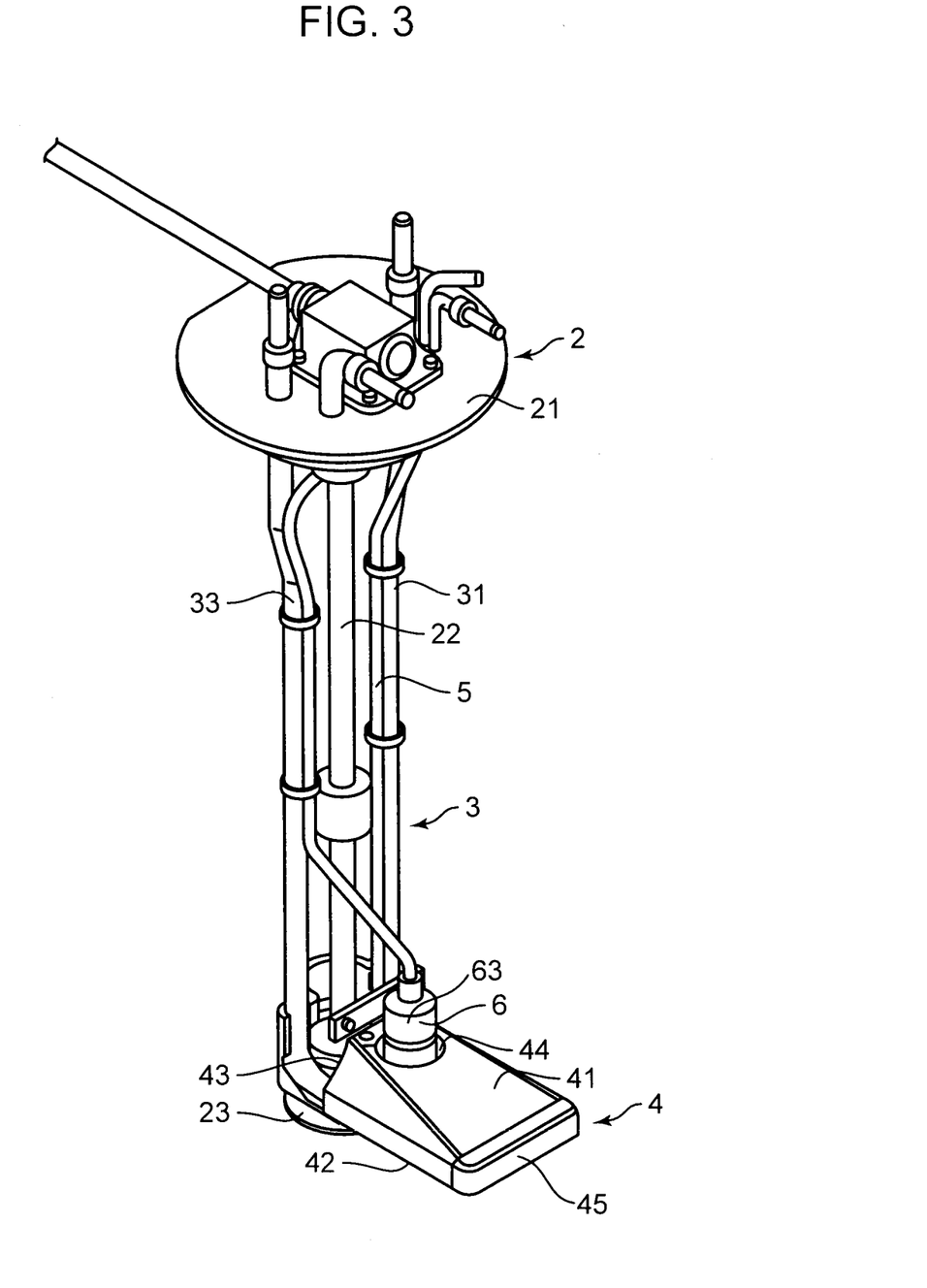
FIG. 3 is a schematic perspective view showing the reductant according to the embodiment, without a tank main body.
Figure 4:
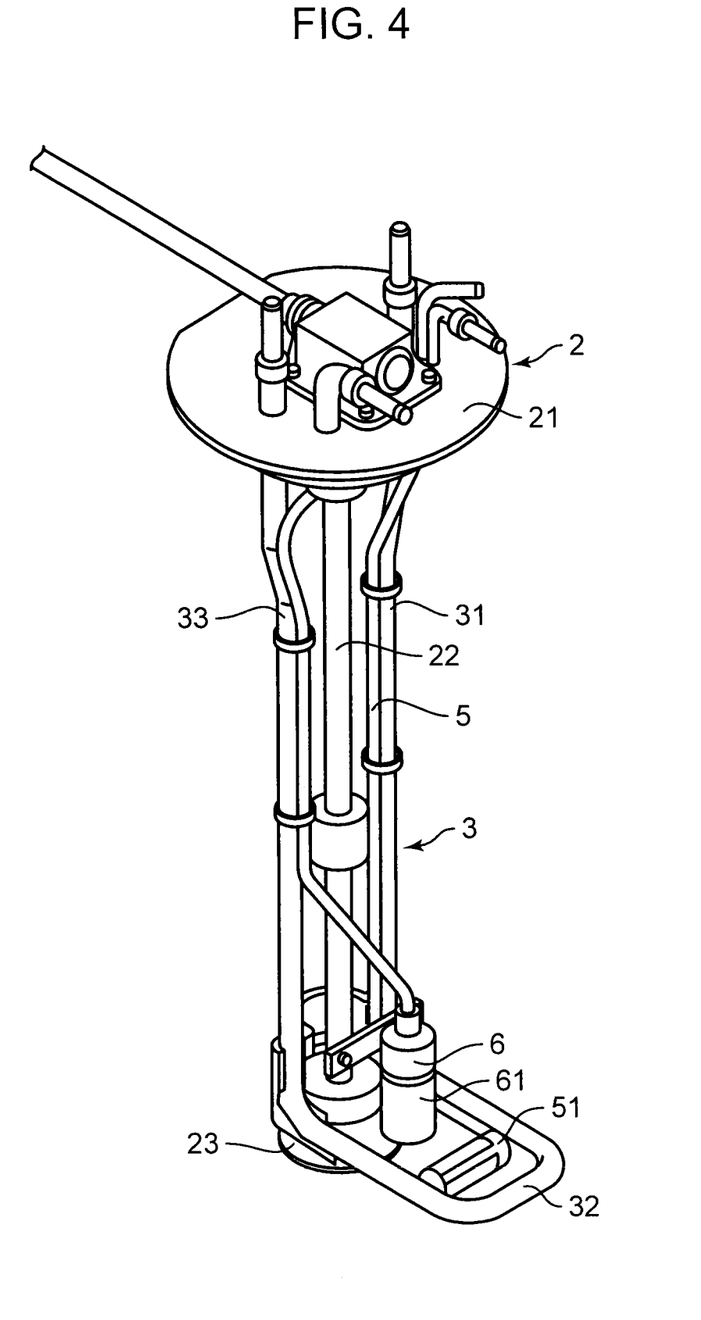
FIG. 4 is a schematic perspective view shown in FIG. 2, without a covering member.
Figure 5:
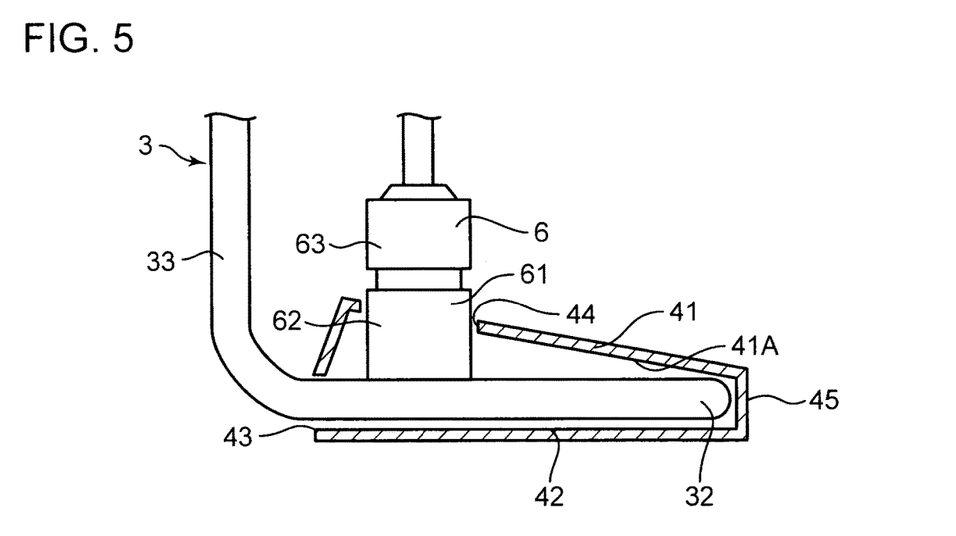
FIG. 5 is a lateral partial cross-sectional diagram showing the substantial parts of the reductant container according to the embodiment.

The tank main body 1 accommodates the urea water U1 for reducing the exhaust gas.

The support member 2 supports the heat exchange pipe 3, covering member 4, reductant suction pipe 5, and temperature measuring unit 6, which are described hereinafter. The support member 2 has an upper support portion 21, a support column 22, and a lower support portion 23. The upper support portion 21 is supported by an upper surface of the tank main body 1, outside the tank main body 1. The support column 22 is placed inside the tank main body 1 and extends from the upper surface of the tank main body 1 to a lower surface of the same. An upper end of the support column 22 is connected to the upper support portion 21. The lower support portion 23 is connected to a lower end of the support column 22. The lower support portion 23 is also fixed to a part of the lower surface of the tank main body 1, inside the tank main body 1. Specifically, a part of the lower surface of the tank main body 1 protrudes toward the upper surface of the tank main body 1, and the lower support portion 23 is fixed to the protruding part of the lower surface of the tank main body 1.

For example, while supporting the heat exchange pipe 3, covering member 4, reductant suction pipe 5, and temperature measuring unit 6 which are described hereinafter, the support member 2 is inserted into the tank main body 1 from an opening provided in the upper surface of the tank main body 1, in the direction in which the support column 22 extends. Then, in a position where the lower support portion 23 is fixed to the part of the lower surface of the tank main body 1 and the upper support portion 21 is supported by the upper surface of the tank main body 1, the support member 2 and each of the members supported by the support member 2 are held in the tank main body 1.

In a case where, for example, the reductant container X1 is used in a cold region, the heat exchange pipe 3 unfreezes the urea water U1 that is frozen in the tank main body 1. The heat exchange pipe 3 allows warm water to circulate in the heat exchange pipe 3. The heat exchange pipe 3 unfreezes the urea water U1 by causing heat exchange between the urea water U1 in the tank main body 1 and the warm water. Note that the warm water may not circulate inside the heat exchange pipe 3, and a heating medium capable of increasing the temperature of the urea water U1 by heat exchange with the urea water U1 may circulate inside the heat exchange pipe 3.

The heat exchange pipe 3 has an inflow-side pipe 31, a returning pipe 32, and an outflow-side pipe 33.

The engine cooling water that becomes warm water by passing through the water jacket WJ of the engine E flows into the inflow-side pipe 31. The inflow-side pipe 31 lets the warm water flow out of the water jacket WJ to the returning pipe 32. The inflow-side pipe 31 is supported by the upper support portion 21 on the outside of the tank main body 1. The inflow-side pipe 31 also extends in the tank main body 1 along the support column 22.

The returning pipe 32 corresponds to the heating member according to the present invention, which specifically is a heating medium supply pipe. The returning pipe 32 is disposed in the covering member 4 of the heat exchange pipe 3, the covering member 4 being described hereinafter. The returning pipe 32 has a shape returning from the inflow-side pipe 31 to the outflow-side pipe 33 inside the covering member 4. The returning pipe 32 is supported by the lower support portion 23.

The warm water that passes through the returning pipe 32 flows into the outflow-side pipe 33. The outflow-side pipe 33 lets the warm water flow out from the returning pipe 32 to the engine cooling tank C1. The outflow-side pipe 33 extends in the tank main body 1 along the support column 22. The outflow-side pipe 33 is also supported by the upper support portion 21 on the outside of the tank main body 1.

Although the present embodiment employs the returning pipe 32 of the heat exchange pipe 3 as the heating member according to the present invention, the heating member is not limited thereto. A heater or the like, for example, can be employed as the heating member according to the present invention.

Also, although the present embodiment employs engine cooling water passing through the water jacket WJ of the engine E1 as the warm water that circulates through the heat exchange pipe 3, the warm water is not limited thereto. For example, a reductant unfreezing tank may be provided in addition to the engine cooling tank C1 in the construction machine, and warm water that is contained in the reductant unfreezing tank may be used as the warm water that circulates through the heat exchange pipe 3. When using the engine cooling water as the warm water that circulates through the heat exchange pipe 3, it is not necessary to provide a reductant unfreezing tank in addition to the cooling tank C1 in the construction machine, simplifying the structure of the construction machine.

The covering member 4 promotes an increase in temperature of the urea water U1 as well as unfreezing of the same by means of the heat exchange pipe 3. Specifically, the covering member 4 promotes an increase in temperature of the urea water U1 as well as unfreezing of the same around the returning pipe 32 of the heat exchange pipe 3 by covering the returning pipe 32, thereby reducing the time taken from unfreezing the urea water U1 to supplying the resultant urea water U1 to the outside of the reductant container X1.

The covering member 4 has an upper wall 41, a lower wall 42, an opening portion 43, a closure portion 45, and a communication hole 44.

The upper wall 41 covers the returning pipe 32 of the heat exchange pipe 3 from above. The lower wall 42, opposing the upper wall 41, covers the returning pipe 32 of the heat exchange pipe 3 from below. In the present embodiment, the covering member 4 is in the shape of a box, wherein the returning pipe 32 is located between the upper wall 41 and the lower wall 42. Note that the covering member 4 does not have to be in the shape of a box and may not have, for example, the lower wall 42.

The opening portion 43 is located between the upper wall 41 and the lower wall 42. The opening portion 43 is opened in a direction perpendicular to the thickness direction of the upper wall 41 and the lower wall 42, and connects the inside of the covering member 4 with the outside of the covering member 4. The closure portion 45 is located on the side opposite to the opening portion 43, and separates the inside of the covering member 4 from the outside of the covering member 4 in the direction perpendicular to the thickness direction of the upper wall 41 and the lower wall 42. The returning pipe 32 of the heat exchange pipe 3, having the shape returning in a region closer to the closure portion 45 than the opening portion 43, receives the warm water introduced into the covering member 4 through the opening portion 43 and guides the warm water to the outside of the covering member 4 through the opening portion 43. Note that the positions of the opening portion 43 and the closure portion 45 may be determined arbitrarily and can be changed appropriately in accordance with the form of use of the reductant container X1. For instance, the opening portion 43 may be provided in the upper wall 41 or the lower wall 42.

In the present embodiment, the opening portion 43 also functions as an inflow portion for allowing some of the urea water U1 accommodated in the tank main body 1 to flow into the covering member 4. However, the opening portion 43 does not have to function as the inflow portion. In such a case, for example, an inflow portion may be provided in the covering member 4 separately from the opening portion 43, to allow some of the urea water U1 accommodated in the tank main body 1 to flow into the covering member 4 through this inflow portion.

The communication hole 44 is provided in the upper wall 41. The communication hole 44 brings the inside of covering member 4 into communication with the outside of the covering member 4. The covering member 4 is molded by machining, for example, a metallic material into a predetermined shape.

The reductant suction pipe 5 supplies the urea water U1, unfrozen in the covering member 4, to the exhaust pipe D1 of the construction machine located outside the reductant container X1. The urea water U1 that is supplied from the reductant suction pipe 5 to the exhaust pipe D1 becomes ammonia in the exhaust pipe D1, which causes a reduction reaction with nitrogen oxide contained in the exhaust gas, thereby eliminating the nitrogen oxide of the exhaust gas.

Figure 6:
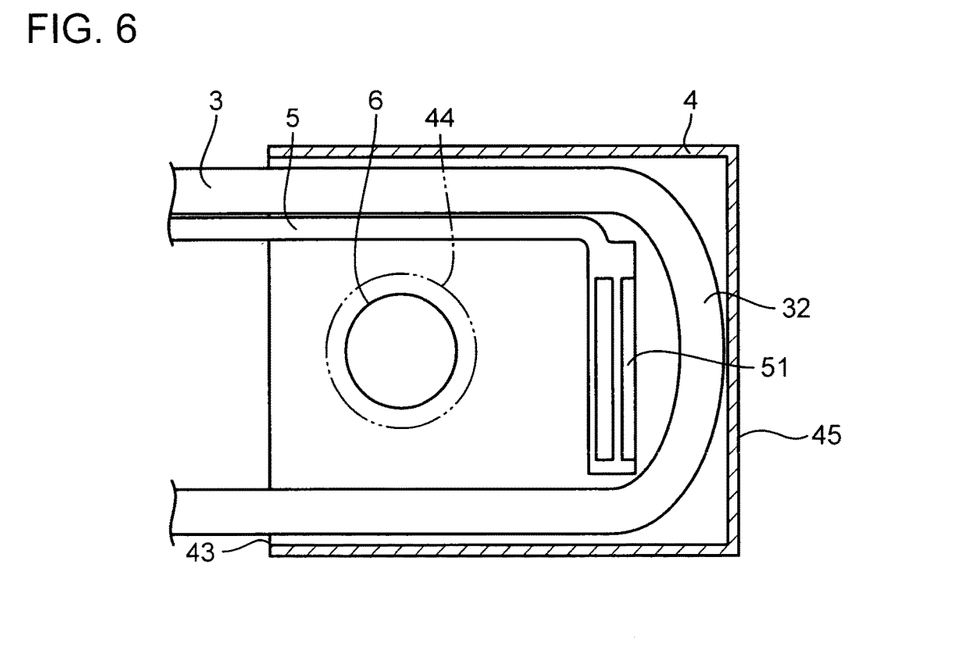
FIG. 6 is a top partial cross-sectional diagram showing the substantial parts of the reductant container according to the embodiment.

The reductant suction pipe 5 extends along the inflow-side pipe 31. The reductant suction pipe 5 has an upper end that supports the upper support portion 21 of the support member 2, and a lower end located on the inside of the covering member 4. The lower end of the reductant suction pipe 5 has a suction portion 51 for drawing the urea water U1 contained in the covering member 4. The suction portion 51 is located in a region surrounded by the returning pipe 32 inside the covering member 4, as shown in FIG. 6.

The temperature measuring unit 6 is the unit for measuring the temperature of the urea water U1 in the covering member 4. The entire temperature measuring unit 6 is located inside the tank main body 1. The temperature measuring unit 6 is fixed to the covering member 4. The temperature measuring unit 6 has a first section 62 located on the inside the covering member 4 and a second section 63 located on the outside of the covering member 4. The communication hole 44 is interposed between the first section 62 and the second section 63. The boundary portion between the first section 62 and the second section 63 of the temperature measuring unit 6 is located in the communication hole 44. The first section 62 of the temperature measuring unit 6 includes a temperature sensor 61 sensing the temperature of the urea water U1. The temperature measuring unit 6 determines the temperature sensed by the temperature sensor 61. The first section 62 of the temperature measuring unit 6 is located in the region surrounded by the returning pipe 32 inside the covering member 4, as shown in FIG. 6. The first section 62 of the temperature measuring unit 6 is also located farther away from the closure portion 45 than from the suction portion 51, as shown in FIG. 6.

In the reductant container X1, the temperature sensor 61 senses the temperature of the urea water U1 unfrozen in the covering member 4, allowing the temperature measuring unit 6 to determine this temperature. Only when the temperature reaches a predetermined temperature, the suction portion 51 of the reductant suction pipe 5 sucks the urea water U1 unfrozen in the covering member 4. Therefore, in the reductant container X1, only the urea water U1 that satisfies a concentration condition corresponding to the predetermined temperature can be supplied to the outside of the reductant container X1. Note that the temperature measuring unit 6 may be a concentration meter that measures the temperature sensed by the temperature sensor 61 of the temperature measuring unit 6 and thereby measures the concentration of the urea water U1 based on the measured temperature.

The reductant container X1 is characterized in having a lower surface 41A which is an internal surface of the upper wall 41 of the covering member 4 facing the inside of the covering member 4, wherein the lower surface 41A is inclined so as to be raised toward the temperature sensor 61. In the present embodiment, the lower surface 41A of the upper wall 41 of the covering member 4 is inclined so as to be raised from the closure portion 45 toward the temperature sensor 61. Also in the present embodiment, the communication hole 44 is provided in a region on the upper wall 41 that is close to the inflow-side pipe 31 and the outflow-side pipe 33, and the lower surface 41A of the upper wall 41 provided with the communication hole 44 is inclined so as to be raised toward the inflow-side pipe 31 and the outflow-side pipe 33. In the present embodiment, because the upper wall 41 has substantially uniform thickness, both the lower surface 41A of the upper wall 41 and the upper wall 41 are inclined so as to be raised toward the inflow-side pipe 31 and the outflow-side pipe 33.

In the reductant container X1 described above, because the lower surface 41A of the upper wall 41 is inclined upward toward the temperature sensor 61, heat conduction towards the lower surface 41A of the upper wall 41 by the convection of the urea water U1 unfrozen in the covering member 4 takes place mainly around the temperature sensor 61. As a result, the temperature of the urea water U1 around the temperature sensor 61 can be increased rapidly.

According to this reductant container X1 capable of rapidly increasing the temperature of the urea water U1 around the temperature sensor 61, the time taken from unfreezing the urea water U1 to supplying the resultant urea water U1 to the outside can be reduced. For instance, in a case where the suction portion 51 sucks the urea water U1 unfrozen in the covering member 4 only when the temperature of the urea water U1 determined by the temperature measuring unit 6 reaches a predetermined value, if the increase of the temperature of the urea water U1 around the temperature sensor 61 is slow, it takes a certain amount of time from unfreezing the urea water U1 to supplying the resultant urea water U1 to the outside. However, in the reductant container X1, the temperature of the urea water U1 around the temperature sensor 61 can be increased rapidly because the lower surface 41A of the upper wall 41 of the covering member 4 is inclined so as to be raised toward the temperature sensor 61. As a result, the time taken from unfreezing the urea water U1 to supplying the resultant urea water U1 to the outside can be reduced.

Furthermore, in the reductant container X1, the suction portion 51 and the temperature sensor 61 are located in the region surrounded by the returning pipe 32 inside the covering member 4. Therefore, the temperature of the urea water U1 around the suction portion 51 and the temperature sensor 61 can be increased efficiently. The region surrounded by the returning pipe 32 inside the covering member 4 is where the temperature of the urea water U1 is increased intensively. Because the reductant container X1 has the suction portion 51 and the temperature sensor 61 placed in the region surrounded by the returning pipe 32, the temperature of the urea water U1 around the suction portion 51 and the temperature sensor 61 can be increased efficiently.

In addition, in this reductant container X1, the lower surface 41A of the upper wall 41 of the covering member 4 is inclined so as to be raised from the closure portion 45 toward the temperature sensor 61. Therefore, the heat in the urea water U1 in the covering member 4 can efficiently be transferred to the vicinity of the temperature sensor 61. When the returning pipe 32 has the shape returning in a region closer to the closure portion 45 than the opening portion 43 inside the covering member 4, the heat easily fills up the region inside the covering member 4 at the closure portion 45 side. In the reductant container X1, because the lower surface 41A of the upper wall 41 of the covering member 4 is inclined so as to be raised from the closure portion 45 toward the temperature sensor 61, the heat trapped in the covering member 4 at the closure portion 45 side can be transferred efficiently to the vicinity of the temperature sensor 61 along the lower surface 41A of the upper wall 41.

Moreover, in this reductant container X1, the temperature sensor 61 is located farther away from the closure portion 45 than from the suction portion 51. In other words, the distance between the temperature sensor 61 and the closure portion 45 is greater than the distance between the suction portion 51 and the closure portion 45. This configuration can prevent the unfrozen urea water U1 around the suction portion 51 from being drawn by the suction portion 51. In the reductant container X1, the suction portion 51 is located in the covering member 4, in the vicinity of the closure portion 45, where the temperature increases relatively easily, while the temperature sensor 61 is located farther away from the closure portion 45 than from the suction portion 51. Therefore, the temperature of the urea water U1 around the suction portion 51 increases more rapidly than the urea water U1 around the temperature sensor 61. Such a configuration can prevent a problem that the urea water U1 around the suction portion 51 cannot be unfrozen at the moment when the temperature of the urea water U1 sensed by the temperature sensor 61 reaches a predetermined value.

Furthermore, in the reductant container X1, the temperature measuring unit 6 has the first section 62 inside the covering member 4 and the second section 63 outside the covering member 4. Therefore, the internal volume of the covering member 4 can be made smaller than that obtained when the entire temperature measuring unit 6 is positioned inside the covering member 4. Thus, the temperature of the urea water U1 in the covering member 4 can be increased more rapidly.

In addition, in the reductant container X1, an outer rim in the upper wall 41 of the covering member 4 that surrounds the communication hole 44 is spaced away from an outer surface of the temperature measuring unit 6. In other words, a gap that brings the inside of the covering member 4 communication with the outside of the covering member 4 is interposed between the outer rim in the upper wall 41 of the covering member 4 that surrounds the communication hole 44 and the outer surface of the temperature measuring unit 6. Therefore, the second section 63 of the temperature measuring unit 6 that is positioned outside the covering member 4 can be heated up, preventing a decrease in the temperature measurement accuracy of the temperature measuring unit 6. In the reductant container X1, heat conduction towards the lower surface 41A of the upper wall 41 by the convection of the urea water U1 contained in the covering member 4 takes place mainly around the temperature sensor 61, and the heat is transferred from the inside of the covering member 4 to the outside of the covering member 4 through the gap. Consequently, not only can the first section 62 of the temperature measuring unit 6 that is positioned inside the covering member 4 be heated up, but also the second section 63 of the temperature measuring unit 6 located outside the covering member 4. This can prevent a decrease in the temperature measurement accuracy of the temperature measuring unit 6.

The above has described in detail the reductant container X1 according to the present embodiment. However, the form of the lower surface 41A of the upper wall 41 in the covering member 4 is not limited to the form shown in FIG. 5; thus, the modifications shown in FIGS. 7 to 9, for example, can be employed.

Figure 7:
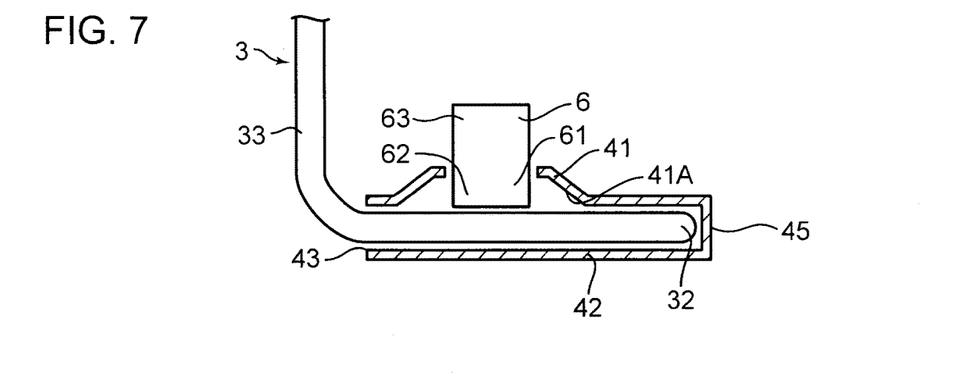
FIG. 7 is a diagram of a modification of the reductant container according to the embodiment, showing the same sections as FIG. 5.

As shown in FIG. 7, the lower surface 41A of the upper wall 41 in the covering member 4 may have an inclined portion around the temperature sensor 61, which is inclined so as to be raised toward the temperature sensor 61, and a flat portion that is located farther away from the temperature sensor 61 than the inclined portion is and parallel to an upper surface of the lower wall 42. Such a configuration can rapidly increase the temperature of the urea water U1 around the temperature sensor 61 while reducing the internal volume of the covering member 4.

Figure 8:
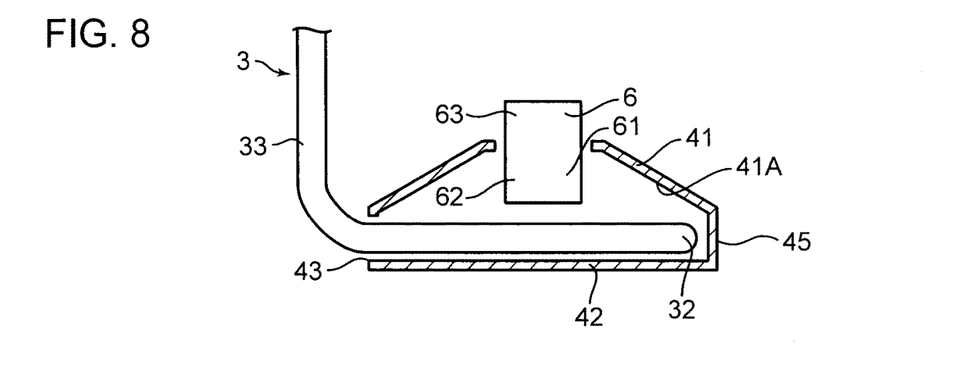
FIG. 8 is a diagram of another modification of the reductant container according to the embodiment, showing the same sections as FIG. 5.

Also, as shown in FIG. 8, the temperature measuring unit 6 may be positioned in substantially the middle of the upper wall 41. In other words, so long as the lower surface 41A of the upper wall 41 satisfies the condition that it is inclined so as to be raised toward the temperature sensor 61, the position of the temperature measuring unit 6 may be determined arbitrarily and can be changed appropriately in accordance with the form of use of the reductant container X1.

Figure 9:
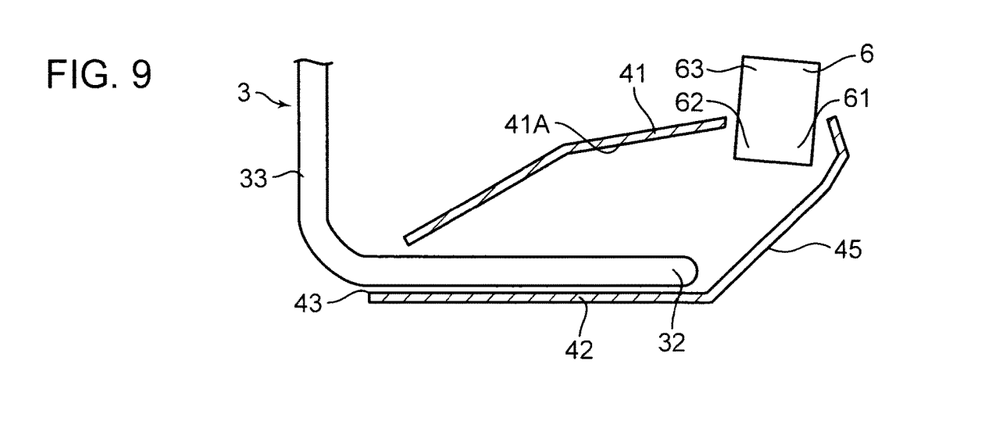
FIG. 9 is a diagram of yet another modification of the reductant container according to the embodiment, showing the same sections as FIG. 5.

Furthermore, as shown in FIG. 9, the temperature measuring unit 6 may be located farther away from the outflow-side pipe 33 than the tip end of the returning pipe 32.

Moreover, in the reductant container X1 according to the present embodiment, the temperature measuring unit 6 has the first section 62 positioned inside the covering member 4 and the second section 63 positioned outside the covering member 4; however, the entire temperature measuring unit 6 may be placed inside the covering member 4. In such a case as well, so long as the temperature sensor 61 is provided, for example, in an upper part of the temperature measuring unit 6 so as to be closer to the lower surface 41A of the upper wall 41, and so long as the lower surface 41A is inclined so as to be raised toward the temperature sensor 61, the temperature of the urea water U1 around the temperature sensor 61 can be increased rapidly as in the embodiment described above.

Note that the specific embodiment described above includes an invention having the following configurations.

Specifically, the reductant container according to the present invention is a reductant container having the following configurations: a tank main body that accommodates a reductant; a heating member disposed in the tank main body and configured to generate heat so as to increase a temperature of the reductant; a covering member covering the heating member and having an inflow portion, the inflow portion allowing some of the reductant accommodated in the tank main body to flow into the covering member; a reductant supply pipe through which the reductant in the covering member is supplied to the outside of the tank main body; and a temperature measuring unit having a temperature sensor disposed in the covering member to sense a temperature of the reductant in the covering member, the temperature measuring unit determining the temperature sensed by the temperature sensor, wherein the covering member has an upper wall covering the heating member from above, the upper wall having a lower surface that is inclined so as to be raised toward the temperature sensor.

According to this reductant container, the temperature of the reductant around the temperature sensor can be increased rapidly in the covering member, reducing the time taken from unfreezing the reductant to supplying the resultant reductant to the outside. More specifically, according to this reductant container, when the reductant contained in the tank main body becomes frozen, the temperature of the reductant in the covering member is increased by the heating member, thereby unfreezing the reductant in the covering member. As a result of unfreezing the reductant, the resultant fluid reductant transfers the heat of the heating member toward the lower surface side of the upper wall of the covering member by the convection of the reductant. The lower surface of the upper wall inclines so as to be raised toward the temperature sensor in the reductant container allows the heat transmitted toward the lower surface of the upper wall to concentrate in a section around the temperature sensor that is located in the highest portion of the lower surface of the upper wall, thus enabling the temperature around the temperature sensor to be increased rapidly. This allows the time it takes for the temperature determined by the temperature measuring unit to reach a temperature satisfying a predetermined concentration condition to be reduced, thereby reducing the time taken from unfreezing the reductant to supplying the resultant reductant to the outside.

It is preferred that the heating member includes a heating medium supply pipe that guides a heating medium into the covering member and guides the heating medium inside the covering member to the outside of the covering member, the heating medium supply pipe having a shape returning inside the covering member, the reductant supply pipe has a suction portion located inside the covering member, the suction portion configured to suck the reductant in the covering member, and the suction portion and the temperature sensor are located in a region that is surrounded by the heating medium supply pipe inside the covering member.

According to the reductant container, in which the suction portion and the temperature sensor are located in a region that is surrounded by the heating medium supply pipe inside the covering member, the temperature of the reductant around the suction portion and the temperature sensor can be increased efficiently. For instance, in a case where the heating medium supply pipe corresponding to the heating member surrounds a predetermined region in the covering member by having a shape returning inside the covering member, the temperature of the reductant in this region can be increased intensively. However, in the reductant container described above, locating the suction portion and the temperature sensor in this region enables the temperature of the reductant around the suction portion and the temperature sensor to be increased efficiently.

Furthermore, it is preferred that the covering member has an opening portion bringing the inside of the covering member into communication with the outside of the covering member, and a closure portion for separating the inside of the covering member from the outside of the covering member, the heating medium supply pipe guides the heating medium to the inside of the covering member through the opening portion, the heating medium supply pipe having the shape returning in a region closer to the closure portion than the opening portion to guide the heating medium to the outside of the covering member through the opening portion, and the lower surface of the upper wall is inclined so as to be raised from the closure portion toward the temperature sensor.

According to this reductant container, the lower surface of the upper wall in the covering member inclined so as to be raised from the closure portion toward the temperature sensor allows the heat in the reductant contained in the covering member to be transferred efficiently to the vicinity of the temperature sensor. For example, in the configuration in which the covering member has the opening portion and the closure portion, heat easily fills up the covering member at the closure portion side more, compared to the opening portion side. Especially when the heating medium supply pipe has the shape returning in a region closer to the closure portion than to the opening portion, the heat that is transferred from the returning section of the heating medium supply pipe to the reductant is easily trapped in the covering member at the closure portion side. Hence, In the reductant container, the lower surface of the upper wall in the covering member inclined so as to be raised from the closure portion toward the temperature sensor allows the heat trapped in the covering member at the closure portion side to be transferred efficiently to the vicinity of the temperature sensor along the lower surface of the upper wall.

Moreover, it is preferred that the temperature sensor is located farther away from the closure portion than the suction portion.

This reductant container can prevent the frozen reductant around the suction portion from sucking by the suction portion. Specifically, in this reductant container, by placing the suction portion and the temperature sensor in a region inside the covering member that is surrounded by the heating medium supply pipe, the temperature of the reductant around the suction portion and the temperature sensor can be increased efficiently. Also, because the temperature sensor is positioned in a region farther away from the closure portion than the suction portion, where heat tends to be trapped relatively, the temperature of the reductant around the suction portion can be increased more rapidly, compared to the temperature of the reductant around the temperature sensor. Such a configuration can prevent a problem that the reductant around the suction portion cannot be unfrozen at the moment when the temperature of the reductant sensed by the temperature sensor reaches a predetermined value.

It is preferred that the upper wall of the covering member has a communication hole bringing the inside of the covering member into communication with the outside of the covering member; the temperature measuring unit has a first section located inside the covering member and a second section located outside of the covering member, the communication hole interposed between the first section and the second section; and the first section includes the temperature sensor.

According to this reductant container, the internal volume of the covering member can be made smaller than that obtained when the entire temperature measuring unit is positioned inside the covering member. Thus, the temperature of the reductant in the covering member can be increased more rapidly. Specifically, since only the first section of the temperature measuring unit that includes the temperature sensor is positioned on the inside of the covering member in this reductant container, not only is it possible for the temperature sensor to sense the temperature of the reductant contained in the covering member, but also the internal volume of the covering member can be made smaller than that obtained when the entire temperature measuring unit is stored in the covering member.

In addition, it is preferred that the upper wall of the covering member has an outer rim surrounding the communication hole, and the temperature measuring unit has an outer surface spaced away from the outer rim of the upper wall.

According to this reductant container, the unfrozen, fluid reductant can transfer the heat of the heating member to the outside of the covering member through the space between the outer rim of the covering member that surrounds the communication hole and the outer surface of the temperature measuring unit. Thus, the temperature measuring unit located outside the covering member can be heated up efficiently, preventing a decrease in the temperature measurement efficiency of the temperature measuring unit.

This application is based on Japanese Patent application No. 2014-038064 filed in Japan Patent Office on Feb. 28, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A reductant container, comprising:
a tank main body that accommodates a reductant;
a heating member disposed in the tank main body and configured to generate heat so as to increase a temperature of the reductant;
a covering member covering the heating member and having an inflow portion, the inflow portion allowing some of the reductant accommodated in the tank main body to flow into the covering member;
a reductant supply pipe through which the reductant in the covering member is supplied to the outside of the tank main body; and
a temperature measuring unit having a temperature sensor disposed in the covering member to sense a temperature of the reductant in the covering member, the temperature measuring unit determining the temperature sensed by the temperature sensor,
wherein the covering member has an upper wall covering the heating member from above, the upper wall having a lower surface that is inclined so as to be raised toward the temperature sensor, wherein
the heating member includes a heating medium supply pipe that guides a heating medium into the covering member and guides the heating medium inside the covering member to the outside of the covering member, the heating medium supply pipe having a shape returning inside the covering member,
the reductant supply pipe has a suction portion located inside the covering member, the suction portion configured to suck the reductant in the covering member, and
the suction portion and the temperature sensor are located in a region that is surrounded by the heating medium supply pipe inside the covering member.

2. The reductant container according to claim 1, wherein the covering member has an opening portion bringing the inside of the covering member into communication with the outside of the covering member, and a closure portion separating the inside of the covering member from the outside of the covering member,
the heating medium supply pipe guides the heating medium to the inside of the covering member through the opening portion, the heating medium supply pipe having the shape returning in a region closer to the closure portion than the opening portion to guide the heating medium to the outside of the covering member through the opening portion, and
the lower surface of the upper wall is inclined so as to be raised from the closure portion toward the temperature sensor.

3. The reductant container according to claim 2, wherein the temperature sensor is located farther away from the closure portion than the suction portion.

4. The reductant container according to claim 1, wherein:
the upper wall of the covering member has a communication hole bringing the inside of the covering member into communication with the outside of the covering member;

the temperature measuring unit has a first section located inside the covering member and a second section located outside of the covering member, the communication hole interposed between the first section and the second section; and the first section includes the temperature sensor.

5. The reductant container according to claim 4, wherein the upper wall of the covering member has an outer rim surrounding the communication hole, and the temperature measuring unit has an outer surface spaced away from the outer rim of the upper wall.

\* \* \* \* \*